July 3, 1934.  A. A. KOTTMAN  1,964,824
CONTROL FOR BREAD SLICING MACHINES
Filed March 31, 1932  4 Sheets-Sheet 3
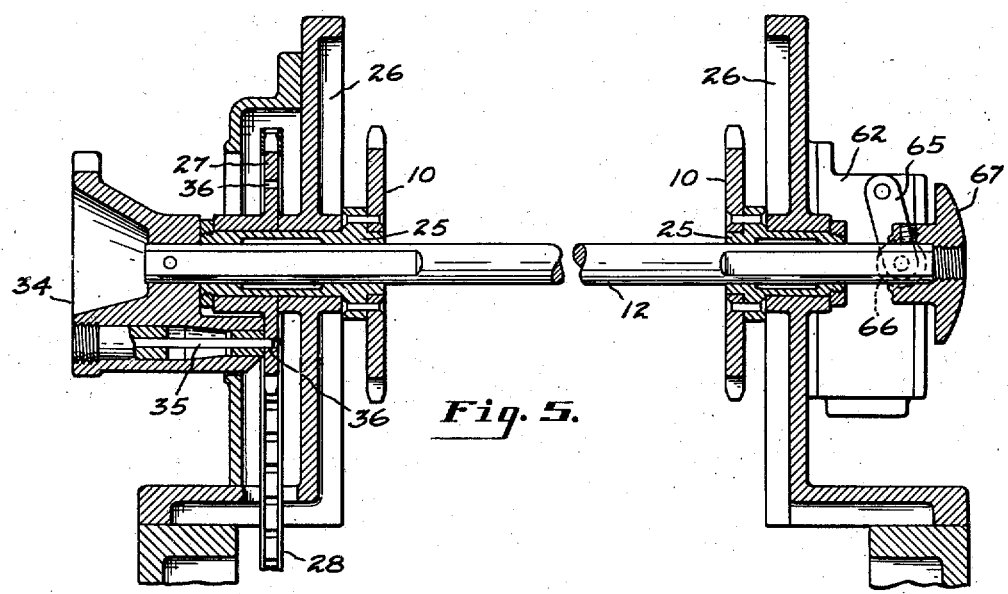
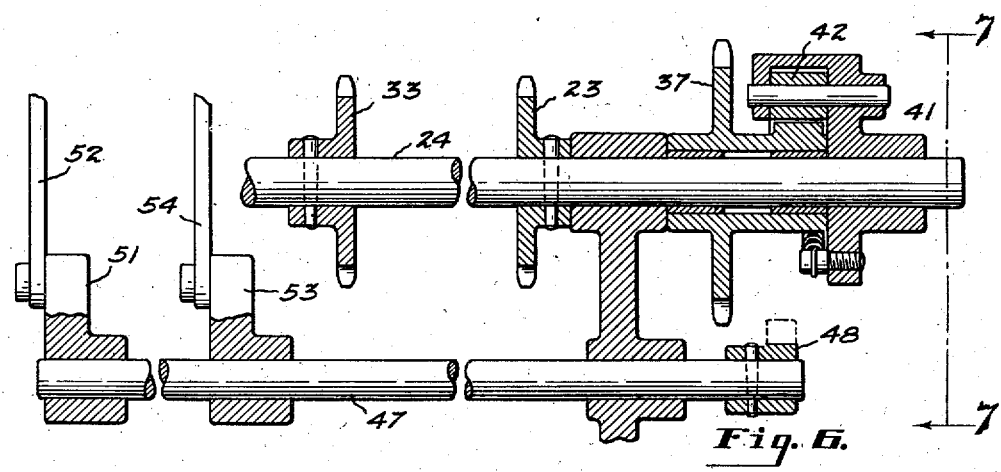
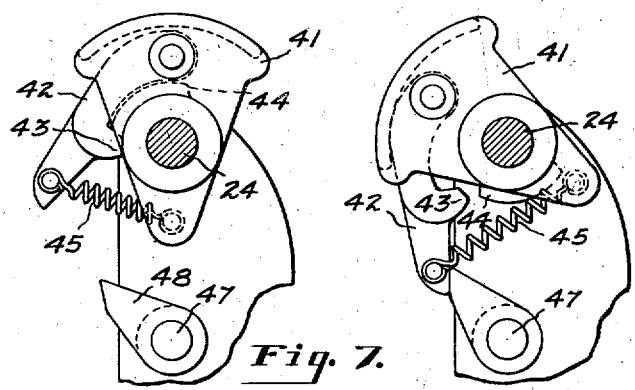
INVENTOR
*A. A. Kottman*
BY
ATTORNEYS July 3, 1934.   A. A. KOTTMAN   1,964,824
CONTROL FOR BREAD SLICING MACHINES
Filed March 31, 1932   4 Sheets-Sheet 4

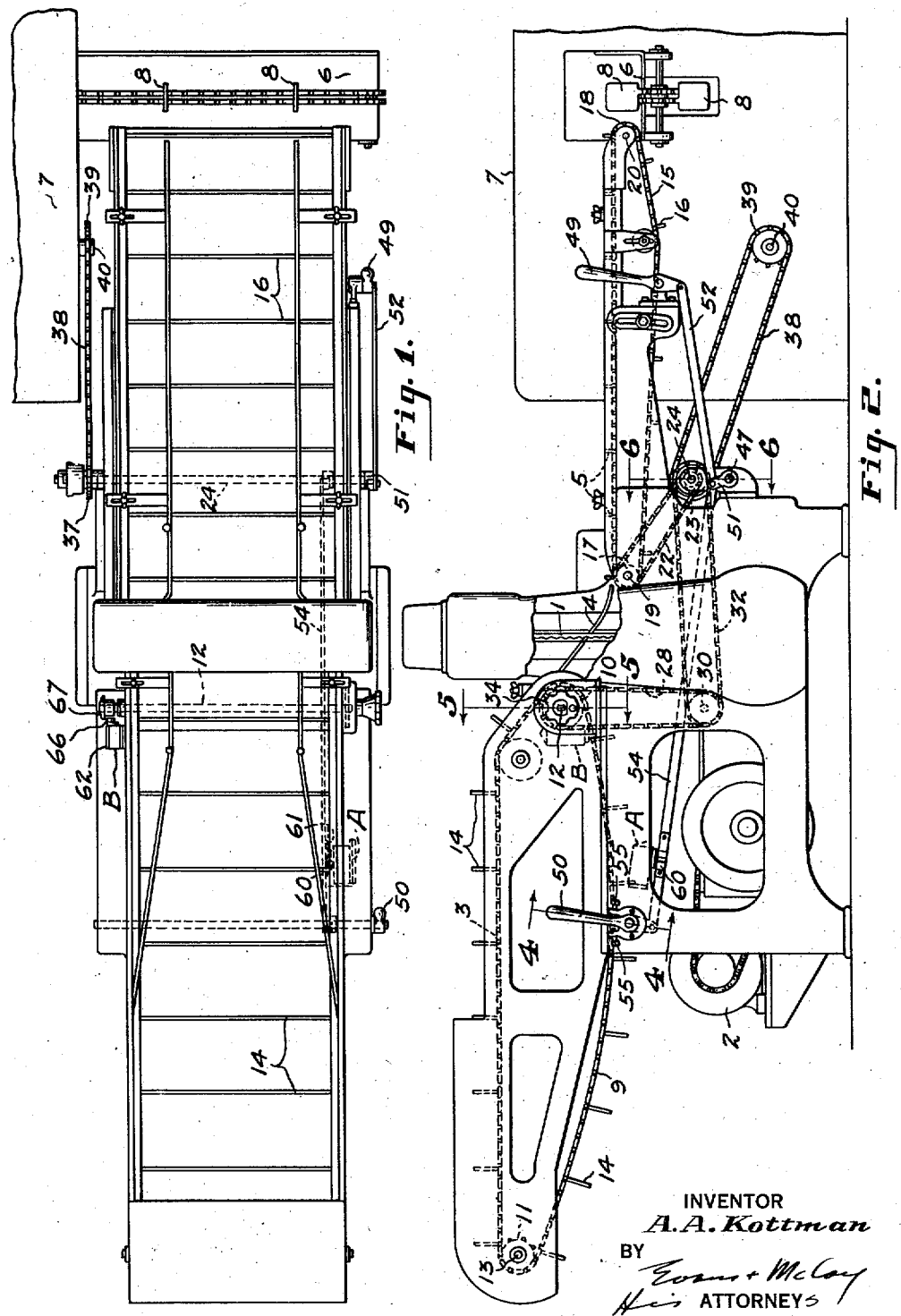

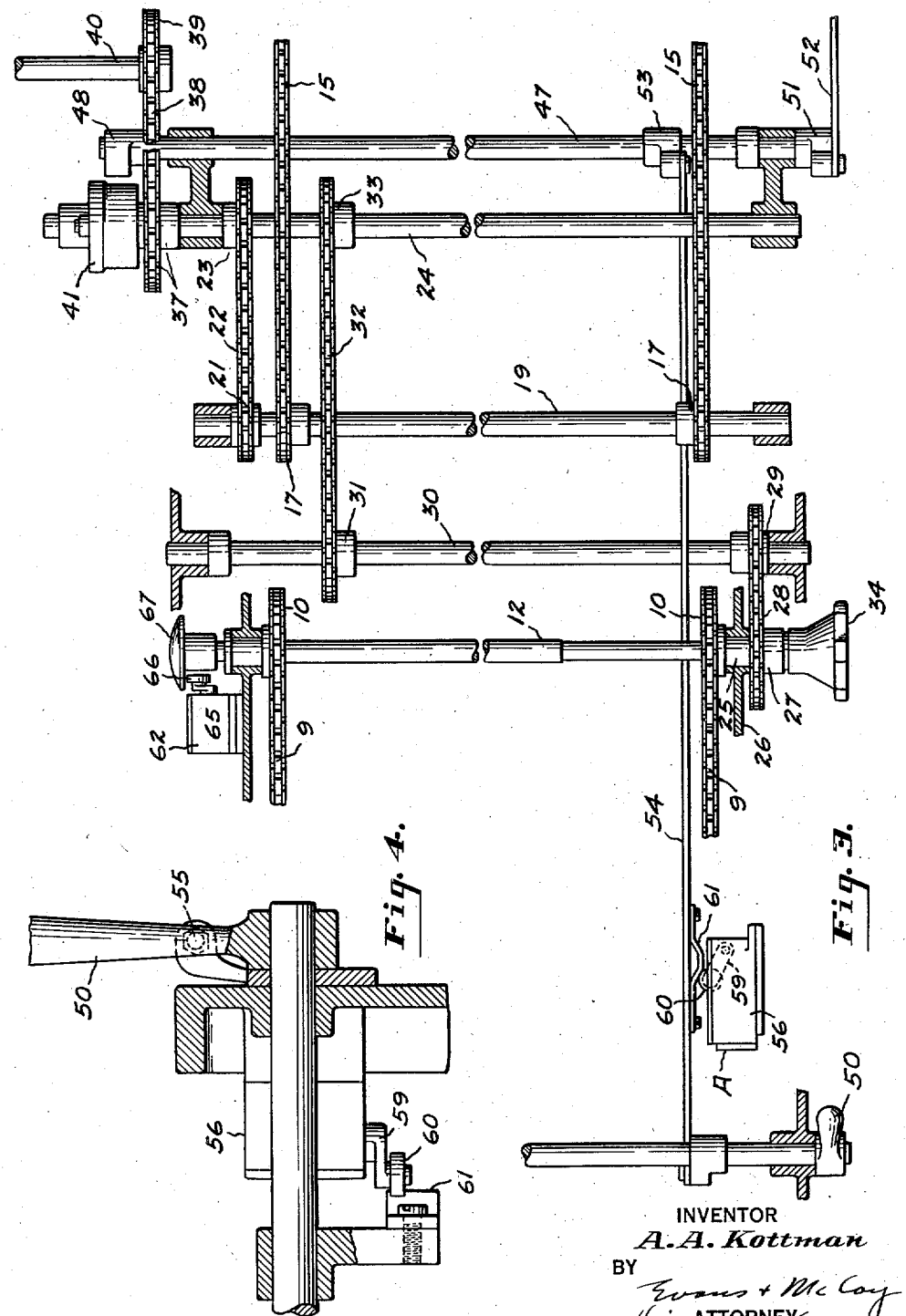

INVENTOR
A. A. Kottman
BY
His ATTORNEYS

Patented July 3, 1934

1,964,824

UNITED STATES PATENT OFFICE 1,964,824

CONTROL FOR BREAD SLICING MACHINES

Arthur A. Kottman, Davenport, Iowa, assignor, by mesne assignments, to The Micro Corporation, Bettendorf, Iowa, a corporation of Delaware Application March 31, 1932, Serial No. 602,232

13 Claims. (Cl. 146—153)

This invention relates to bread slicing machines and more particularly to control mechanism therefor.

One of the objects of the present invention is to provide a bread slicing machine having feed and discharge conveyors with means to control the operation of these conveyors in such manner that the feed conveyor can operate only when the cutter blades are up to speed and in operation.

Another object is to provide a bread slicing machine having feed and discharge conveyors with means to control the operation thereof in such manner that the feed conveyor may operate simultaneously with or independently of the cutting mechanism and feed conveyor.

Another object is to provide a bread slicing machine having feed and discharge conveyors with a single control mechanism therefor in which the conveyors may operate in timed relation.

A further object is to provide a bread slicing machine having feed and discharge conveyors with a control mechanism which automatically allows the cutting mechanism to attain its cutting speed before the feed conveyor starts into operation in order to prevent clogging of the cutting mechanism.

A still further object is to provide a bread slicing machine having feed and discharge conveyors and in which the conveyors have one source of driving means and the slicing mechanism has a separate source of driving means, with a simple controlling mechanism which will permit of instantaneous and simultaneous operation of the machine.

With the above and other objects in view which will be readily apparent from the following detailed description, the present invention consists in certain features of construction and combinations of parts that will be readily understood by those skilled in the art to which the invention appertains.

In the drawings which illustrate a suitable embodiment of the invention,

Figure 1 is a plan view of the complete slicing machine which will be described in detail;

Fig. 2 is a side elevation of the machine, a portion of the framework being broken away to show the slicing blades;

Fig. 3 is a fragmentary plan layout of the various driving mechanism for the feed and discharge conveyors;

Fig. 4 is an enlarged section taken substantially on the line 4—4 of Fig. 2 showing the control lever;

Fig. 5 is an enlarged fragmentary section taken substantially on the line 5—5 of Fig. 2 showing the feed conveyor clutch in driving position;

Fig. 6 is an enlarged section taken substantially on the line 6—6 of Fig. 2 showing the operating clutch between the common conveyor drive shaft and the driving means;

Figs. 7 and 8 are similar sections taken substantially at 7—7 of Fig. 6 showing engaged and disengaged positions of the main driving clutch;

Figure 9:
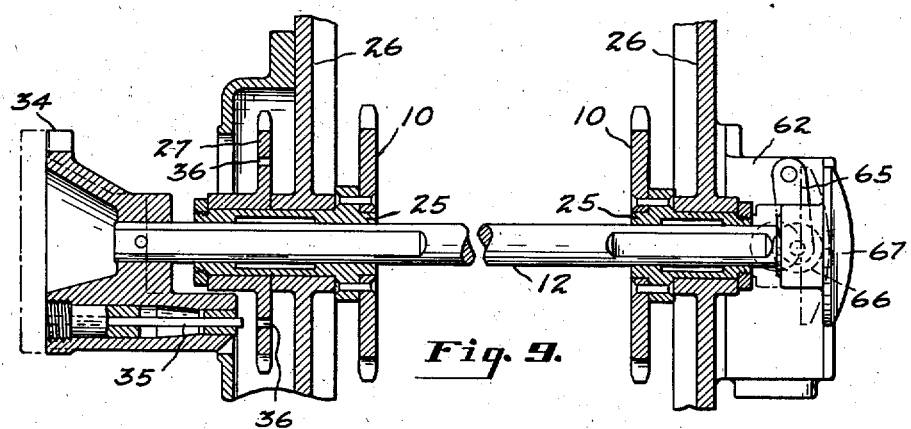
Fig. 9 is a view similar to Fig. 5 showing the feed conveyor clutch in disengaged position.

Referring to the accompanying drawings in which like numerals refer to like parts throughout the several views, the detailed construction of the slicing mechanism and the feed and discharge conveyors is shown in a copending application of Taylor Creech, Serial No. 573,105, filed November 5, 1931, and containing claims to the conveyor mechanism, and it is necessary to describe the same only in a general manner. The slicing mechanism here shown is of the reciprocable blade type in which the blades 1 are actuated from a motor 2. It is to be understood, however, that the present invention is applicable to other types of slicing mechanism as well.

The bread to be sliced is fed by means of an endless feed conveyor 3 to an inclined slide 4 which conducts the bread to and through the cutter blades 1 where it is discharged in sliced position onto the discharge conveyor 5. The discharge conveyor 5 operates in timed sequence with the feed conveyor 3 and discharges the sliced bread into a proper position directly onto the feed table 6 of a bread wrapping machine that is here shown in outline. Incidentally, the feed and discharge conveyors are driven directly from the wrapping machine in order that the discharge conveyor 5 may operate in timed relation with the conveyor 8 of the wrapping machine 7. This, however, will be later described in detail.

Referring to Figs. 1, 2 and 3, the feed and discharge conveyors here shown are of the flight type but it is to be understood that they may be of the endless apron type. The feed conveyor 3 comprises a pair of spaced side chains 9 interconnected by flights 14, which operate over sprockets 10 and 11 mounted on forward and rearward shafts 12 and 13, respectively. Similarly the discharge conveyor 5 comprises a pair of spaced side chains 15 interconnected by spaced flights 16, which operate over sprockets 17 and 18 mounted on rearward and forward shafts 19 and 20, respectively.

The rearward shaft 19 of the discharge conveyor is provided with a driven sprocket 21 which is driven, as here shown, by means of a link chain 22 from a drive sprocket 23 mounted on a common drive shaft 24 for the two conveyors.

Referring to Figs. 5 and 9, the forward shaft 12 of the feed conveyor is slidable relative to the sprockets 10 which are driven thereby, the sprockets 10 being carried by axially immovable bushings 25 carried by the side frames 26. As shown in these views, the bushing 25 for the sprocket 10 at the left side of these views also carries a freely rotatable driven sprocket 27 which is driven by means of a link chain 28 from a drive sprocket 29 keyed to a countershaft 30. The countershaft 30 carries a driven sprocket 31 which in turn is driven by a link chain 32 from a drive sprocket 33 also mounted on the common drive shaft 24.

As previously stated, the sprocket 27 freely rotates on the bushing 25 and the bushing 25 is driven from the shaft 12 through coacting squared or polygonal surfaces, although the shaft 12 may be moved axially of the bushing 25. A clutch mechanism which will now be described is provided to drive the shaft 12 from the sprocket 27. This mechanism comprises a hand wheel 34 or some such member rigidly secured to the outer end of the shaft 12 and which carries an inwardly extending engaging pin 35, as shown in Fig. 5, this pin 35 being engageable with any one of a number of openings 36 in the sprocket 27. It can thus be seen that by moving the shaft 12 outwardly, as in Fig. 9, that the pin 35 can be withdrawn from the sprocket opening which will permit the feed conveyor to be stopped without stopping the discharge conveyor which is also driven from the common drive shaft 24. Similarly, by moving the shaft 12 inwardly the pin 35 can be engaged with one of the sprocket openings 36 to place the feed conveyor into operation. The clutch mechanism is arranged as described in the copending application to change the relative positions of the flights on the two conveyors to provide proper timed operation to meet different operating conditions. This, however, is not one of the features of the present invention. There is another feature embodied therein that will be later described.

The common drive shaft 24, as previously described, is driven directly from the wrapping machine in order that the discharge conveyor will act in timed relation with the feeding means for the wrapping machine 7. This is accomplished by means of a driven sprocket 37 rotatably mounted on the drive shaft 24 which is driven by a link chain 38 from a sprocket 39 mounted on a drive shaft 40 of the wrapping machine 7.

The driving connection between the rotatable sprocket 37 and the common drive shaft 24 is provided by a pawl type clutch device that comprises a support 41 secured to the outer end of the shaft 24 and which carries a pivoted pawl 42 that has a hook portion 43 extending inwardly toward the shaft 24, the pawl being resiliently held in an inward position by a spring 45 attached to the pawl and to the support 41.

The hook portion 43 of this pawl is positioned to engage with a lug 44 extending radially outwardly from the hub of the sprocket 37 as shown in Fig. 6, so that with the pawl in this position the shaft 24 will be directly driven by the sprocket 37.

This clutch mechanism is so designed that when it is thrown out of driving relation, the discharge conveyor can be stopped and then started at a predetermined position with respect to the feed mechanism of the wrapping machine. The side frames of the machine carry an oscillatory shaft 47 disposed below the shaft 24 which carries a dog 48, and by rotating the shaft 47 through a predetermined degree, the dog 48 can be moved upwardly to such a position that it will be in the rotary path of the pawl 42 and will engage with the pawl and move it outwardly out of contact with the lug 44 of the driven sprocket 37, thereby stopping the operation of the discharge conveyor. The conveyor can then be again put in operation by releasing the dog, thereby permitting inward movement of the pawl, the pawl however engaging the lug 44 of the sprocket 37 at a predetermined time. The shaft 47 is oscillated by either one of two levers 49 and 50, the lever 49 being mounted at the forward end of the machine and connected to an arm 51 of the shaft 47 through an actuating rod 52 and the lever 50 being mounted at the rearward end of the machine, as shown in Fig. 2, and connected to an arm 53 of the shaft 47 through a corresponding actuating rod 54. As shown in Fig. 2, the movement of the levers 49 and 50 and thereby the shaft 47 is limited by means of opposed adjustable stops 55 which are positioned to engage opposite sides of the lever 50.

In the device of the present invention, the feed and discharge conveyors are controlled electrically in such a manner that (first) the discharge can be operated independently while the feed conveyor and slicing mechanism are inoperative so that the discharge conveyor may be conveniently employed to properly feed unsliced loaves of bread to the wrapping machine, (second) to provide simultaneous timed operation of the feed and discharge conveyors and the slicing mechanism, and (third) to permit the slicing mechanism to get up to proper slicing speed before the feed conveyor starts feeding loaves of bread to the cutters. This is accomplished by limit switches A and B which are dependent on a magnetic control device C.

Figure 10:
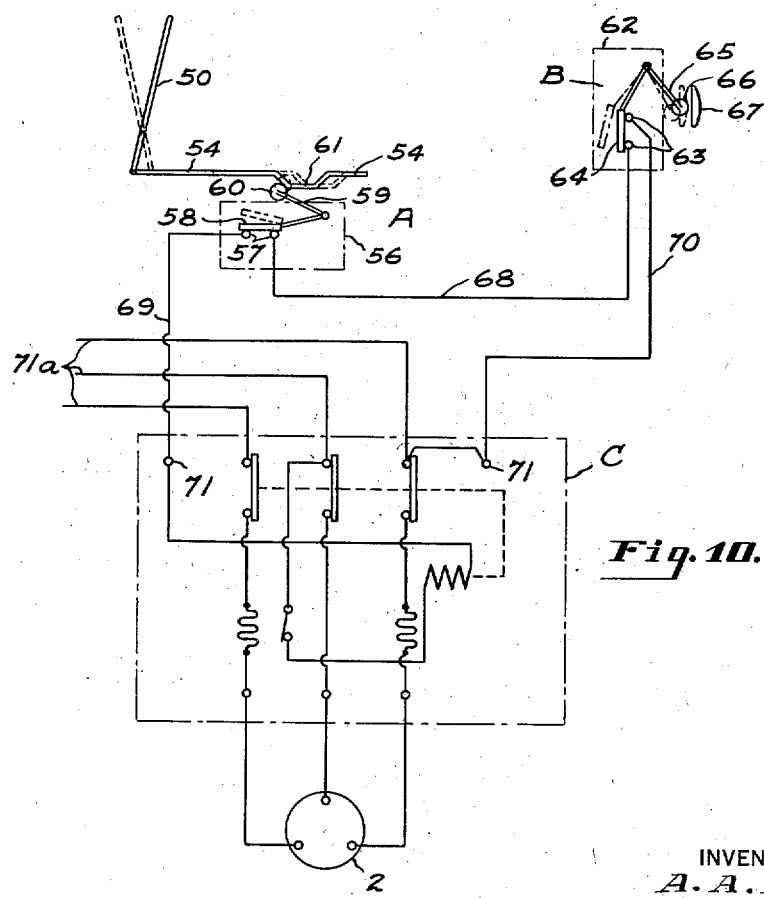
Fig. 10 is a wiring diagram showing the electrical hook-up for the electrical control mechanism.

The limit switch A may be of any desired construction and is here shown as comprising (as seen in Figs. 3, 4 and 10), a housing 56 secured to the side frame adjacent the actuating bar 54 which carries a pair of spaced contact posts 57, and a contact bar 58, the bar 58 being movable to close the gap between the posts 57 by means of a pivoted actuator 59. This actuator carries a roller 60 at its free end which is positioned to engage with a cam member 61 secured to the actuating bar 54 so that when the bar 54 is moved in one direction the cam member 61 thereof will cause the actuator 59 to make a contact between the two posts 57.

The limit switch B may also be of any desired construction but as here shown in Figs. 3, 5, 9 and 10 comprises a housing 62 mounted on the other side frame and contains a pair of contact posts 63, a contact therebetween being made by a contact bar 64 which likewise is operated by a pivoted actuator 65, the actuator carrying a roller 66 at its end. The roller 66 is engaged by the flange of a head member 67 that is adjustably mounted on the end of the forward shaft 12 of the feed conveyor so that when the shaft 12 is moved axially of the sprocket 27 the contact bar 64 will make a contact between the posts 63 just prior to the engagement of the pin 35 with the sprocket opening 36 in order that the cutter blades will be in operation while adjustment is made between the feed and discharge conveyors.

Similarly the circuit is broken only when the pin 35 is moved a substantial distance away from the opening 36, as shown in Fig. 9. As a result the pin can be centered in any desired opening 36 while the blades are in operation, depending on the size of loaf of bread, for the proper transfer of the loaf from the feed conveyor to the discharge conveyor.

Although not shown in the drawings, suitable spring means is preferably provided to prevent inadvertent retraction of the pin 35 from the particular opening 36 with which it is engaged during normal operation.

Referring to the wiring diagram (Fig. 10), one contact post 57 of the limit switch A is connected directly with a contact post 63 of the limit switch B by a lead wire 68, and the other contact posts 57 and 63 are connected by lead wires 69 and 70, respectively, to the binding posts 71 of the magnetic switch device C. The motor 2 which drives the slicing mechanism is also connected into the magnetic switch device C and further is connected directly into the circuit which includes the limit switches A and B. It is thus seen that in order for the motor 2 to operate and drive the slicing mechanism, it is necessary that the circuit be closed by the limit switches. Although not shown in the drawings, it is desirable to connect the feed wires 71ª of the magnetic switch directly to the corresponding wires of the wrapping machine so that both devices will be fed from the same power line. It is not believed necessary at this time to completely describe the inner wirings of the magnetic switch C.

Assuming that the wrapping machine is in operation and the pawl clutch mechanism for the main or common drive shaft 24 disengaged, it will be noted that for this initial position the circuit is broken at the limit switch A by reason of the fact that for this position the actuating bar 54 is in its extreme forward position, as viewed in Figs. 2 and 8, in order that the dog member 48 will engage and hold the pawl out of contact with the driven sprocket 37.

If it is desired to operate the discharge conveyor only, the shaft 12 of the feed conveyor is moved to the left as viewed in Fig. 9, to disengage the shear pin 35 from the sprocket 27. This also causes the head 67 to engage the roller 66 and move the contact bar 64 of the limit switch B away from the contact posts and thereby break the circuit at this point. Now as the actuator bar 54 is moved to its other extreme position to engage the clutch at the common drive shaft 24, the limit switch A is closed by reason of the engagement of the cam member 61 with the roller 60, but since the circuit is broken by the limit switch B and the drive shaft 12 of the feed conveyor is disconnected from its driving source, neither the slicing mechanism nor the feed conveyor will operate although the discharge conveyor is in operation.

Assuming now that we have the condition where the wrapper 7 is in operation, the conveyor drive disconnected from the wrapper as before but the shaft 12 of the feed conveyor is connected with its driving source, namely, the sprocket 27, then in this condition the limit switch B is closed since the shaft head 67 is out of engagement with the roller 66, but here again the circuit is broken at the limit switch A. Now as the actuator bar 54 is moved to its extreme rearward position, the cam member 61 on the bar 54 causes the limit switch A to close the circuit, whereupon the motor 2 will start the slicing mechanism into operation, and since the pawl 42 will only engage the lug 44 of the sprocket 37 at a predetermined position there will be a slight delay in the operation of the conveyors. Furthermore, the mechanism including the actuator bars 52 and 54, the levers 49 and 50, and the cam 61 is so adjusted that the circuit will be closed and the slicing mechanism set in operation before the dog 48 will release the pawl 42 for engagement with the lug 44 of the sprocket 37. As a result, the slicing mechanism will have ample time to attain its slicing speed before the conveyors are set in operation. This is a material advantage in that loaves of bread can only be fed to the slicing cutters when the cutters are up to their proper speed. This thereby prevents crowding of bread against the cutters when they are not up to speed and as a result prevents crushing of the bread loaves.

It is clearly apparent from the foregoing description that there are four distinct advantages which rise from the control mechanism described: (first) the discharge conveyor may be operated while the feed conveyor and slicing mechanism are inoperative; (second) the feed and discharge conveyors and slicing mechanism may be simultaneously operated; (third) the feed conveyor can operate only when the discharge conveyor and slicing mechanism are in operation; and (fourth) the feed conveyor can operate only after the slicing mechanism has attained its proper cutting speed.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. In a slicing machine, slicing cutters, an electric motor for driving said cutters, a power circuit for said motor, a feed conveyor for feeding articles to be sliced to said cutters, a source of driving power independent of said motor for said feed conveyor, a clutch device for placing said source of driving power into and out of driving engagement with said conveyor, a movable actuator for said clutch, a switch for breaking and closing said power circuit, and means operable by said movable actuator for operating said switch.

2. In a slicing machine, slicing cutters, an electric motor for driving said cutters, a power circuit for said motor, a feed conveyor for feeding articles to be sliced to said cutters, a source of driving power for said feed conveyor, a clutch device for placing said source of driving power into and out of driving engagement with said conveyor, a movable actuator for said clutch, a switch for breaking and closing said power circuit, and means operable by said movable actuator for opening and closing said switch, said actuator being first movable to close said switch through said means and further movable to actuate said clutch to effect a driving connection between said source of driving power and conveyor, whereby said motor may operate said cutters at slicing speed before said conveyor is set in operation.

3. In a slicing machine, slicing cutters, an electric motor for driving said cutters, a power circuit for said motor, a feed conveyor for feeding articles to be sliced to said cutters, a source of driving power for said feed conveyor, a clutch device for placing said source of driving power into and out of driving engagement with said conveyor, a movable actuator for said clutch, a switch for breaking and closing said power circuit, and means mounted on said actuator for opening and closing said switch, said means upon movement of said actuator to effect driving engagement between said source of driving power and said conveyor, being positioned to close said switch before said driving engagement is effected.

4. In a slicing machine, slicing cutters, an electric motor for operating said cutters, a switch for starting and stopping said motor, a feed conveyor for feeding articles to be sliced to said cutters, a drive shaft for said conveyor, driving means independent of said motor for said shaft, a clutch to effect driving engagement of said shaft and means, an actuator to engage and disengage said clutch, and means operable by said actuator to operate said switch.

5. In a slicing machine, slicing cutters, an electric motor for operating said cutters, a switch for starting and stopping said motor, a feed conveyor for feeding articles to be sliced to said cutters, a drive shaft for said conveyor, driving means for said shaft, a clutch to effect driving engagement of said shaft and means, an actuator to engage and disengage said clutch, and means operable by said actuator to open and close said switch, said actuator first being movable to cause said last means to close said switch and thereby start said motor and further movable to engage said clutch to effect driving relation between said conveyor and driving means.

6. In a slicing machine, slicing cutters, an electric motor for operating said cutters, a switch for starting and stopping said motor, a feed conveyor for feeding articles to be sliced to said cutters, a discharge conveyor for moving articles away from said cutters, a common drive shaft for driving said conveyors, driving means independent of said motor for said common drive shaft, a clutch to effect driving engagement of said shaft and means, an actuator to engage and disengage said clutch, and means operable by said actuator to operate said switch.

7. In a slicing machine, slicing cutters, an electric motor for operating said cutters, a switch for starting and stopping said motor, a feed conveyor for feeding articles to be sliced to said cutters, a discharge conveyor for moving articles away from said cutters, a common drive shaft for driving said conveyors, driving means for said common drive shaft, a clutch to effect driving engagement of said shaft and means, an actuator to engage and disengage said clutch, and means operable by said actuator to open and close said switch, said actuator first being movable to cause said last means to close said switch and thereby start said motor and further movable to engage said clutch to effect driving relation between said conveyor and driving means.

8. In a slicing machine, slicing cutters, an electric motor for operating said cutters, a switch for starting and stopping said motor, a feed conveyor for feeding articles to be sliced to said cutters, a discharge conveyor for moving articles away from said cutters, a common drive shaft for driving said conveyors, means to disconnect said feed conveyor from said common drive shaft, driving means independent of said motor for said common drive shaft, a clutch to effect driving engagement of driving shaft and said first means, an actuator to engage and disengage said clutch, and means operable by said actuator to operate said switch.

9. In a slicing machine, slicing cutters, an electric motor for operating said cutters, a switch for starting and stopping said motor, a feed conveyor for feeding articles to be sliced to said cutters, a discharge conveyor for moving articles away from said cutters, a common drive shaft for driving said conveyors, means to disconnect said feed conveyor from said common drive shaft, driving means independent of said motor for said common drive shaft, a clutch to effect driving engagement of driving shaft and said first means, an actuator to engage and disengage said clutch, and means operable by said actuator to operate said switch, said actuator first being movable to cause said last means to close said switch and thereby start said motor and further movable to engage said clutch to effect driving relation between said conveyor and driving means.

10. In a slicing machine, slicing cutters, an electric motor for operating said cutters, a switch for starting and stopping said motor, a feed conveyor for feeding articles to be sliced to said cutters, a discharge conveyor for moving articles away from said cutters, a common drive shaft for driving said conveyors, means including a clutch for effecting driving engagement between said feed conveyor and drive shaft, driving means for said drive shaft, means including a second clutch to effect driving engagement between said driving means and drive shaft, an actuator to engage and disengage said second clutch, said actuator upon movement to engage said second clutch being positioned to close said switch to start said motor.

11. In a slicing machine, slicing cutters, an electric motor for operating said cutters, a switch for starting and stopping said motor, a feed conveyor for feeding articles to be sliced to said cutters, a discharge conveyor for moving articles away from said cutters, a common drive shaft for driving said conveyors, means including a clutch for effecting driving engagement between said feed conveyor and drive shaft, driving means for said drive shaft, means including a second clutch to effect driving engagement between said driving means and drive shaft, an actuator to engage and disengage said second clutch, said actuator upon movement to engage said second clutch being positioned to close said switch to start said motor, said actuator first being movable to close said switch to start said motor and further movable to engage said clutch.

12. In a slicing machine, slicing cutters, an electric motor for operating said cutters, a switch for starting and stopping said motor, a feed conveyor for feeding articles to be sliced to said cutters, a discharge conveyor for moving articles away from said cutters, a common drive shaft for driving said conveyors, means including a clutch for effecting driving engagement between said feed conveyor and drive shaft, driving means for said drive shaft, means including a second clutch to effect driving engagement between said driving means and drive shaft, an actuator to engage and disengage said second clutch, actuating means to engage and disengage said first clutch, and a second switch in parallel with said first switch, said second switch being opened by said actuating means upon disengagement of said first clutch, and said actuator upon movement to engage said second clutch being positioned to close said first switch.

13. In a slicing machine, slicing cutters, an electric motor for operating said cutters, a switch for starting and stopping said motor, a feed conveyor for feeding articles to be sliced to said cutters, a discharge conveyor for moving articles away from said cutters, a common drive shaft for driving said conveyors, means including a clutch for effecting driving engagement between said feed conveyor and drive shaft, driving means for said drive shaft, means including a second clutch to effect driving engagement between said driving means and drive shaft, an actuator to engage and disengage said second clutch, actuating means to engage and disengage said first clutch, and a second switch in parallel with said first switch, said second switch being opened by said actuating means upon disengagement of said first clutch, and said actuator upon movement to engage said second clutch being positioned to close said first switch, said actuator first being movable to close said first switch and further movable to engage said second clutch.

ARTHUR A. KOTTMAN.

CERTIFICATE OF CORRECTION.

Patent No. 1,964,824.            July 3, 1934.

ARTHUR A. KOTTMAN.

It is hereby certified that error appears in the printed specification of the above numbered patent requiring correction as follows: Page 4, lines 75 and 89, claims 8 and 9, respectively, for "driving" read said; and for "first" read driving; and that the said Letters Patent should be read with these corrections therein that the same may conform to the record of the case in the Patent Office.
Signed and sealed this 7th day of August, A. D. 1934.

Leslie Frazer (Seal)            Acting Commissioner of Patents.

13. In a slicing machine, slicing cutters, an electric motor for operating said cutters, a switch for starting and stopping said motor, a feed conveyor for feeding articles to be sliced to said cutters, a discharge conveyor for moving articles away from said cutters, a common drive shaft for driving said conveyors, means including a clutch for effecting driving engagement between said feed conveyor and drive shaft, driving means for said drive shaft, means including a second clutch to effect driving engagement between said driving means and drive shaft, an actuator to engage and disengage said second clutch, actuating means to engage and disengage said first clutch, and a second switch in parallel with said first switch, said second switch being opened by said actuating means upon disengagement of said first clutch, and said actuator upon movement to engage said second clutch being positioned to close said first switch, said actuator first being movable to close said first switch and further movable to engage said second clutch.

ARTHUR A. KOTTMAN.

CERTIFICATE OF CORRECTION.

Patent No. 1,964,824.  July 3, 1934.

ARTHUR A. KOTTMAN.

It is hereby certified that error appears in the printed specification of the above numbered patent requiring correction as follows: Page 4, lines 75 and 89, claims 8 and 9, respectively, for "driving" read said; and for "first" read driving; and that the said Letters Patent should be read with these corrections therein that the same may conform to the record of the case in the Patent Office.
Signed and sealed this 7th day of August, A. D. 1934.

Leslie Frazer (Seal)  Acting Commissioner of Patents.